United States Patent [19]
Wurzburger

[11] 3,783,890
[45] Jan. 8, 1974

[54] PLUG VALVE WITH STORAGE COMPARTMENT

[76] Inventor: Paul D. Wurzburger, 3255 E. Monmouth Rd., Cleveland, Ohio 44118

[22] Filed: Dec. 4, 1972

[21] Appl. No.: 311,845

[52] U.S. Cl. .................. 137/315, 251/287, 251/309
[51] Int. Cl. ........................................... F16k 31/528
[58] Field of Search .......................... 137/315, 327; 251/286, 287, 291, 292, 309, 310

[56] References Cited
UNITED STATES PATENTS

| 565,730 | 8/1896 | Foote | 251/309 |
| 3,052,445 | 9/1962 | Kessler | 251/309 |
| 3,133,723 | 5/1964 | Goldman et al. | 251/309 |

Primary Examiner—Edgar W. Geoghegan
Assistant Examiner—D. R. Matthews
Attorney—Frederic M. Bosworth et al.

[57] ABSTRACT

A rotary plug valve including a valve body open at one or both axial ends and having a bore with a lateral inlet port and a lateral outlet port communicating with the bore on opposite sides thereof. A plug is provided in the bore having a passage which communicates with the inlet and outlet ports in the open position of the valve. Removable sealing means are provided between the bore and the plug for preventing leakage between the inlet and outlet ports and to the outside of the valve. The plug has an opening extending axially inwardly from one or both ends thereof corresponding to the open end or ends of the valve body. The openings are normally closed by closure plugs and serve as storage compartments for replacement parts of the valve. In some forms of the invention a valve operating handle can be threaded into a hole in either closure plug or into a storage compartment itself to serve as an aid in seating or unseating the plug in the valve body.

6 Claims, 4 Drawing Figures

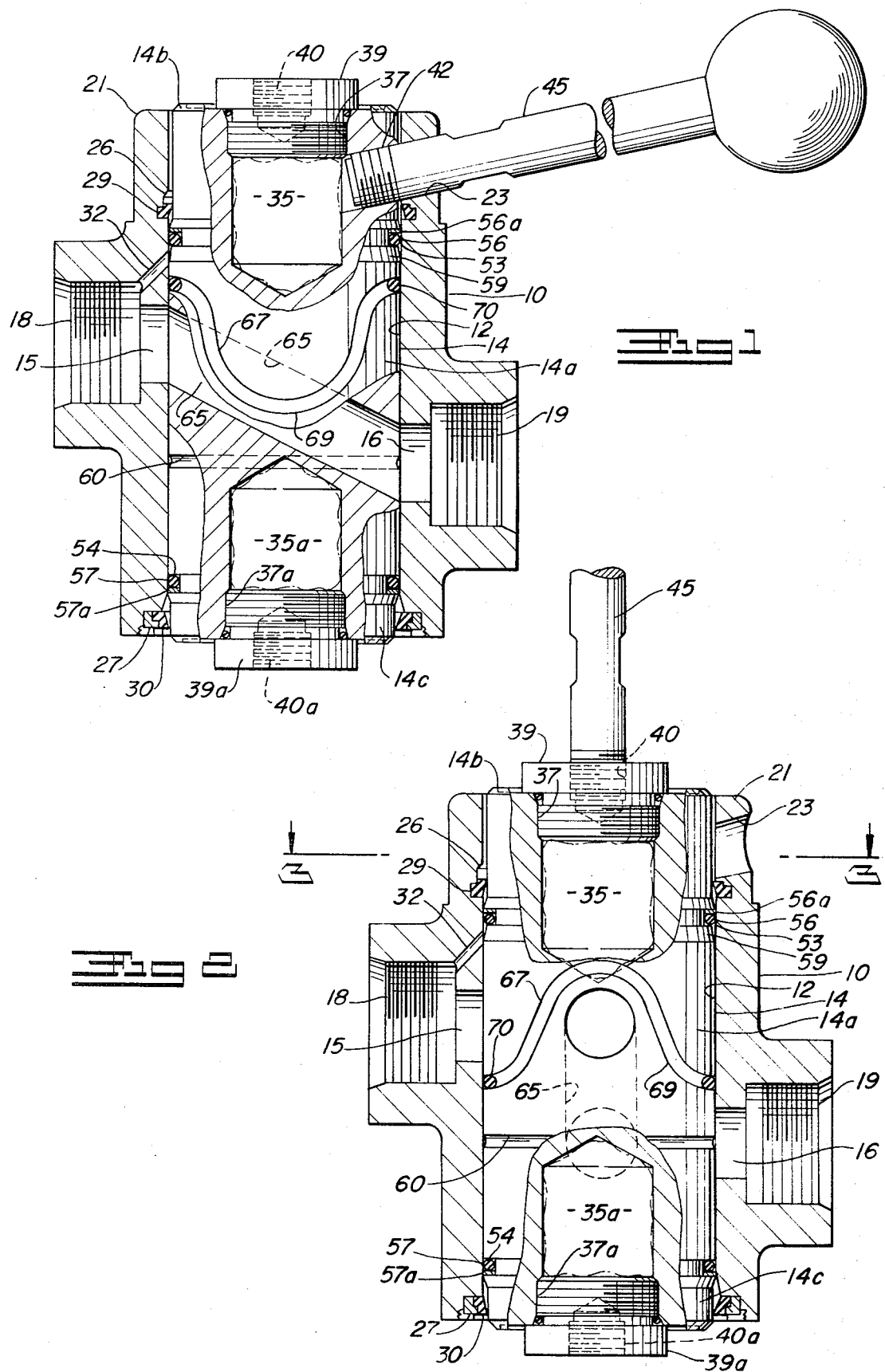

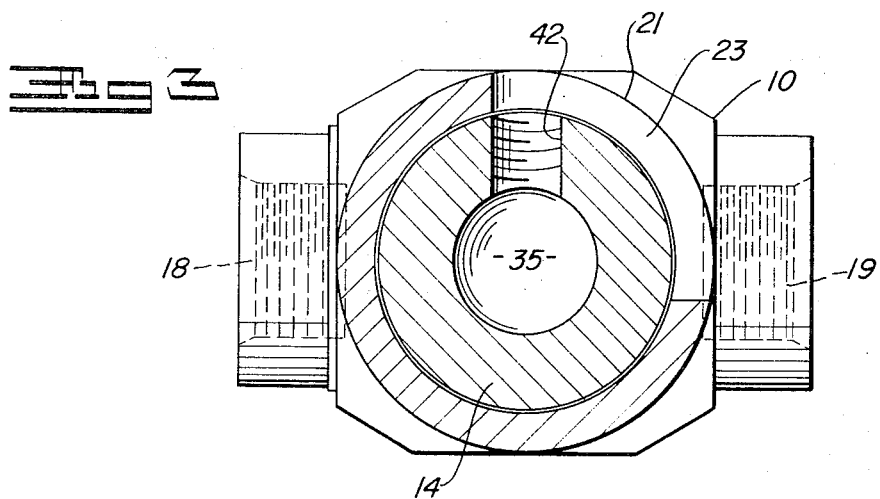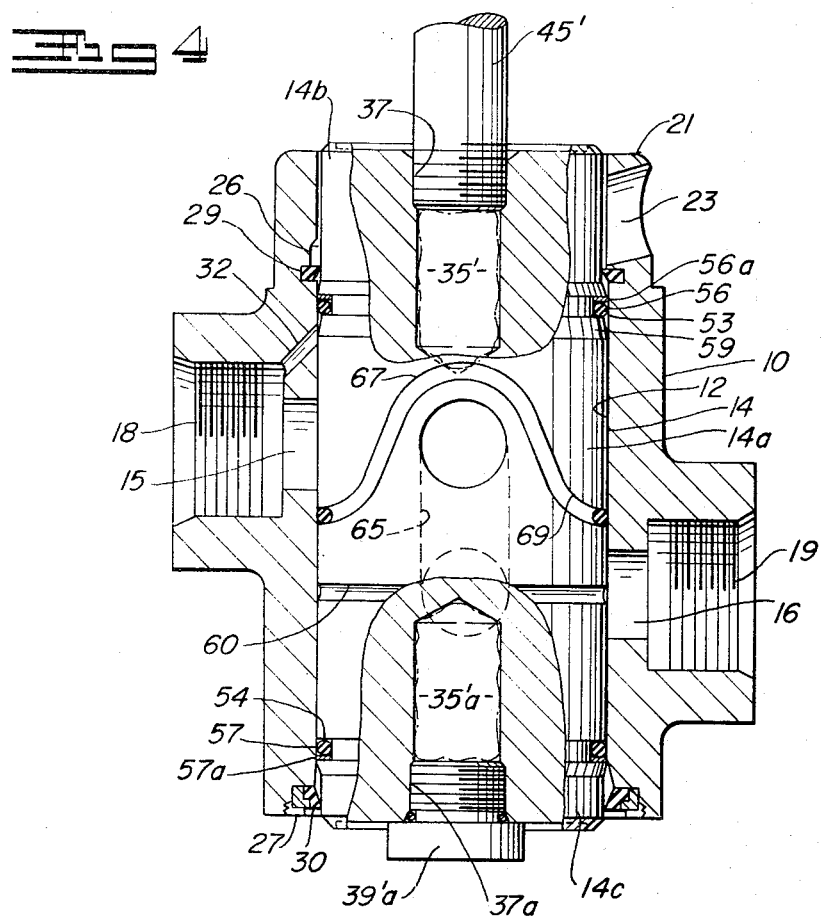

# 3,783,890

PLUG VALVE WITH STORAGE COMPARTMENT

BACKGROUND OF THE INVENTION

This invention relates to rotary plug valves and more particularly to a plug valve having a storage cavity or compartment for the storage of replacement parts and the like.

A typical rotary plug valve includes a valve body having a bore formed therein and inlet and outlet ports leading to and from the bore. A plug is arranged in the bore so as to be rotatable between a closed position in which the inlet and outlet ports are sealed off from one another and an open position in which the ports are placed in communication through a passage or the like in the plug. The plug and the bore are generally either tapered or cylindrical. In some valves sealing means are provided in the clearance between the plug and bore to prevent leakage from the inlet to the outlet port and to the outside of the valve. Other valves rely upon a close fit between the plug and the walls of the bore to prevent leakage between the inlet and outlet ports. These latter valves usually require lubricant between the mating surfaces to minimize wear and the effort required to rotate the plug.

A typical sealing means for the first mentioned type of valve is an elastomeric ring such as an O-ring which is seated in a groove in the periphery of the plug or in the wall of the bore. O-rings may be provided at opposite axial ends of the plug to prevent leakage to the outside of the valve and also intermediate the plug ends to prevent leakage from the inlet to the outlet port in the closed position of the valve.

The O-rings are subject to wear during operation of the valve because of friction and rubbing against the adjacent wall of the bore or periphery of the plug. O-ring seals may also lose their elasticity after prolonged exposure to certain controlled fluids or to contaminants in the fluids. O-rings tend to lose their effectiveness as seals for these and other reasons and must be replaced from time to time to assure reliable operation of the valve. Inevitably, when a replacement O-ring is needed none is at hand and a valve may be kept out of operation for an unduly long period while an O-ring of the proper size and characteristics is located.

Similarly, lubricant in valves requiring it must be replenished occasionally to ensure reliable and trouble free operation of the valve. The proper lubricant, like the proper O-ring is often not readily available when needed.

SUMMARY OF THE INVENTION

A general object of this invention is to provide a rotary plug valve which includes a compartment for the storage of spare parts and the like.

Another object is to provide such a valve in which the storage compartment is accessible without taking the valve out of operation.

Still another object is to provide a rotary plug valve having dual storage compartments both of which are readily accessible without taking the valve out of operation.

Another object is to provide such a valve in which a storage compartment is provided in the plug and which includes means engageable in the storage compartment to assist in removing the plug from the bore.

A preferred form of valve according to the present invention includes a valve body open at one axial end and having a bore with a lateral inlet port and a lateral outlet port communicating with the bore on opposite sides thereof. A plug is provided in the bore and has a passage which communicates with the inlet and outlet ports in the open position of the valve. The plug has an opening extending axially inwardly from the end thereof corresponding to the open end of the valve body and means are provided for normally closing the opening. The opening serves as a storage compartment for replacement parts for the valve.

In one form of the invention the storage opening is threaded and a threaded closure plug is provided for closing it. The valve is provided with an operating handle which is removable and, in this form of the invention and according to another aspect thereof, is engageable with the threads of the storage compartment or with a threaded hole provided in the closure plug so that the handle can be employed to aid in removing the rotary plug from the valve body or inserting it therein.

Where the valve body is open at both axial ends a readily accessible storage compartment can be provided in each end of the plug.

BRIEF DESCRIPTION OF THE DRAWINGS

FIG. 1 is a side elevational view, partly in section, of a valve embodying the present invention, the valve being shown in the open position.

FIG. 2 is a view similar to FIG. 1 with the valve shown in the closed position and prepared for disassembly.

FIG. 3 is a horizontal sectional view of the valve on the line 3—3 of FIG. 2.

FIG. 4 is a side elevational view, partly in section, of an alternate form of valve embodying the present invention, the valve being shown in the closed position and prepared for disassembly.

DESCRIPTION OF THE PREFERRED EMBODIMENTS

Referring initially to FIGS. 1 to 3, a first form of valve embodying the present invention includes a valve body 10 having an axially extending cylindrical bore 12 which is open at both ends. A plug 14 is seated in the bore. A lateral inlet port 15 and a lateral outlet port 16 communicate with the bore 12 on opposite sides thereof. Ports 15, 16 are axially offset for reasons that will appear below. Ports 15, 16 communicate at their ends opposite bore 12 with inlet and outlet connections in the form of threaded sockets 18, 19. The top part of valve body 10 is cylindrical and has an arcuate guide slot 23 in its outer wall. Slot 23 extends through substantially 90° and defines an operating path for a plug operating handle. Recesses 26, 27 are provided in the wall of bore 12 adjacent its top and bottom ends and conventional wiper rings 29, 30 are seated therein to bear resiliently against the periphery of plug 14 and prevent contaminants such as dirt and the like from entering the valve. A passage 32 is provided in the valve body between the inlet socket 18 and bore 12 which serves a purpose described below.

Plug 14 has an axially central sealing portion 14a which has a close fit with bore 12 and has an upper portion 14b and a lower portion 14c which are reduced very slightly in diameter from sealing portion 14a. Both upper portion 14b and lower portion 14c are provided with axially extending openings 35, 35a, respectively, having threads 37, 37a at their respective open ends. Closure plugs 39, 39a are threaded into openings 35, 35a. Each closure plug 39, 39a has a threaded hole 40, 40a, respectively, extending axially from its top surface. The openings 35, 35a serve as convenient and readily accessible storage compartments for spare valve parts such as sealing rings as described below.

The upper portion 14b of the plug also has a tapped hole 42 in its cylindrical surface inclined upwardly at a slight angle toward the periphery of the plug as shown in FIG. 1. A combined plug operating handle, plug retaining means and plug removing means 45 extends through slot 23 in the cylindrical portion 21 of the valve body and into threaded engagement in hole 42. Operating handle 45 can be rotated through the limits defined by slot 23 to rotate plug 14 from one to the other of the open and closed positions of the valve.

The limits of sealing portion 14a of plug 14 are defined by annular groove 53, 54 in the plug in which are seated O-ring seals 56 and 57 and conventional back-up rings 56a and 57a. These O-rings provide a seal between the plug and the bore to prevent leakage of fluid from either open end of the valve. Located axially inwardly of the respective end O-rings 56 and 57 are pressure distributing grooves 59, 60 which ensure that controlled fluid and its pressure is distributed completely about the periphery of plug 14. Normally, there will be sufficient clearance between plug 14 and bore 12 to permit fluid to distribute itself in the clearance. Grooves 59 and 60, however, facilitate and add to such distribution. The passage 32 between inlet socket 18 and bore 12 opens in the bore in substantial alignment with distributing groove 59 to permit the passage of fluid directly thereto. From the groove the fluid can flow axially downwardly in the clearances between plug and bore. The lower distributing groove 60 is positioned to intersect lateral outlet port 16 and no passage is necessary to ensure that fluid is provided to the groove.

A slanted passage 65 extends through the sealing portion 14a of the plug with its central axis intersecting the longitudinal axis of plug 14. The upper end of passage 65 is at the same axial height as inlet port 15 and the lower end of passage 65 is at the same axial height as outlet port 16. In the open position of the valve shown in FIG. 1 passage 65 connects inlet port 15 with outlet port 16. In the closed position of the valve, passage 65 is substantially at right angles to inlet port 15 and outlet port 16.

Flow sealing means generally indicated at 67 is provided between plug 14 and bore 12 to prevent leakage of fluid between the inlet and outlet ports in the closed position of the valve. Flow sealing means 67 follows a cyclical path having peaks that extend alternately above and below one of the ports 15, 16, preferably inlet port 15. Corresponding increments of different cycles of the path lie diametrically opposite each other. As a result, the path defines equal areas between itself and each of the end sealing O-rings 56, 57 at diametrically opposite portions of the plug surface. The areas on the upstream and downstream sides of the plug that can be acted upon by fluid pressure are thus equalized and the forces acting on the plug will be balanced. The path of the flow sealing means in the closed position of the valve is between the inlet port and the outlet port to prevent leakage therebetween.

The flow sealing means is carried by the plug 14 in the form of a sinuous annular groove 69 which completes two full repetitive cycles about the periphery of the plug, and an O-ring 70 seated in the groove. The flow sealing means and its operation and effect are described fully in my copending application filed concurrently with this application and entitled "Pressure-Balanced Plug Valve".

It will be noted that the valve body 10 is open at both ends and that the plug 14 extends outwardly a slight distance from each end. No cap, plug or similar means is provided at either end of the valve body to support and retain the plug therein. In place of an end cap or the like the plug is retained in the bore by operating handle 45 passing through slot 23 as described in my copending application filed concurrently with this application and entitled "Plug Valve With Combined Plug Operating, Retaining And Removal Means".

According to the present invention, the plug 14 is provided with the openings 35, 35a extending axially from each end surface. Openings 35, 35a are each of a length and diameter enabling them to serve as storage compartments for spare parts for the valve. The most likely required replacement parts are the flow sealing O-ring 70 and the end O-rings 56 and 57 for a valve employing O-rings. In the case of valves not employing O-rings but requiring lubricant it may be advantageous to store a small tube or the like of lubricant in a storage compartment. The storage compartments 35, 35a allow replacement O-rings, lubricant or a similar accessory to be immediately available when needed without the necessity of keeping the valve out of operation while a search is conducted for the needed article of the proper characteristics. It is advisable, of course, to replace the O-ring or other article taken from the compartment 35 but this can be done after the valve has been returned to service and without in any way interfering with its operation.

It is also desirable to store, for the valve illustrated, at least one each of end O-rings 56 and 57. Preferably, a replacement is stored for each end O-ring and the O-rings are replaced simultaneously. It may, of course, be found desirable to store replacement parts or articles other than those specifically mentioned or in addition thereto or to store items which are useful in the maintenance of the valve or associated equipment. The items stored can vary according to particular needs. It will be apparent that a storage compartment can be provided in only one end of the plug 14 if that is desired.

According to another aspect of this invention operating handle 45 serves, in cooperation with threaded holes 40, 40a in closure plugs 39, 39a, as a plug removal or insertion means. If it is desired to disassemble the valve or remove the plug from the valve body for any reason, such as to replace or inspect an O-ring or wiper ring, it is first necessary to remove operating handle 45 from its threaded engagement with tapped hole 42 in the plug. This allows the plug to be removed from the valve body. Friction between the O-rings and the wall of the bore may, however, hold the plug in the bore and resist its being removed therefrom. To overcome the friction, operating handle 45 may be threaded into either hole 40 or 40a and employed to push or pull the plug 14 out of the valve body. The operating handle also provides a convenient tool for insertion of the plug into the valve body. The threads of holes 40, 40a and threads 37 and 37a of openings 35, 35a are of the same sign, right hand or left hand, to prevent unscrewing of a closure plug 39, 39a as operating handle 45 is threaded into hole 40 or 40a.

FIG. 4 shows an alternative form of valve embodying the present invention in which operating handle 45' is adapted to be threaded directly into storage compartments 35', 35'a after the closure plug such as 39'a has been removed. To disassemble the valve, operating handle 45' is removed from its threaded engagement with the tapped hole in the plug and, after a closure plug is removed, is threaded into the appropriate storage compartment as shown in FIG. 4 to assist in removing the plug from the valve body as described above. Operating handle 45' when fully threaded into a storage compartment extends therein only to about the same depth as the closure plug so that ample room remains below the handle for stored articles and the articles are in no way affected by the insertion of the operating handle. The remaining parts of the valve of FIG. 4 is essentially the same as in the valve of FIGS. 1 to 3 and are identified by the same reference numerals.

The closure plugs 39, 39a, 39'a may be made of metal or of plastic. When the closure plugs are provided with the holes 40, 40a it is preferred that they be made of metal such as steel. When not provided with the holes 40, 40a the closure plugs are preferably made of plastic for light weight and economy. The plastic plugs may be color coded to enable quick identification of the contents of the storage compartment or of the size or other characteristics of the parts stored therein. Also, the plastic plugs may be snapped or friction fitted into the storage openings rather than threaded therein.

While a preferred and an alternate form of the present invention have been specifically described herein it will be apparent to those skilled in the art that modifications and improvements may be made to the forms disclosed herein without departing from the spirit and scope of the invention. In particular, it will be apparent that the principles of the storage compartment and plug removal means can be employed in plug valves other than those specifically described herein. Accordingly, this invention is not to be limited to the forms herein specifically disclosed nor in any other way inconsistent with the progress in the art promoted by the invention.

What is claimed is:

1. A rotary plug valve comprising a valve body open at one axial end and having a bore with a lateral inlet port and a lateral outlet port communicating with said bore on opposite sides thereof, a plug in said bore having a passage, the ends of which register and communicate with said inlet and outlet ports, respectively, in the open position of the valve, said plug having an opening extending axially inwardly from the end thereof corresponding to the open end of said valve body, said opening serving as a storage compartment for replacement parts of said valve, and means normally closing said storage compartment.

2. A valve according to claim 1 wherein said opening is threaded and said closure means is a threaded closure plug adapted to be threaded into said opening.

3. A valve according to claim 1 wherein said valve body is open at both axial ends and including a second opening extending axially inwardly from the end of said plug adjacent said other open end of said valve body, said opening forming a second storage compartment for replacement parts of said valve, and means closing said second storage compartment.

4. A valve according to claim 1 including a valve operating handle for rotating said plug from one to the other of the open and closed positions of the valve, said operating handle being removable and engageable in said storage compartment to aid in removing said plug from said valve body.

5. A valve according to claim 4 wherein said storage compartment opening and said operating handle are correspondingly threaded to enable said operating handle to be engaged in said opening.

6. A valve according to claim 1 including a valve operating handle for rotating said plug from one to the other of the open and closed positions of the valve and wherein said storage compartment closure means is a closure plug provided on its outer end with a hole adapted to receive the end of said operating handle to enable said operating handle to serve as a removal aid for removing said plug from said bore.

* * * * *